D. F. SAVALLE.
APPARATUS FOR DISTILLING.
No. 79,260. Patented June 23, 1868.
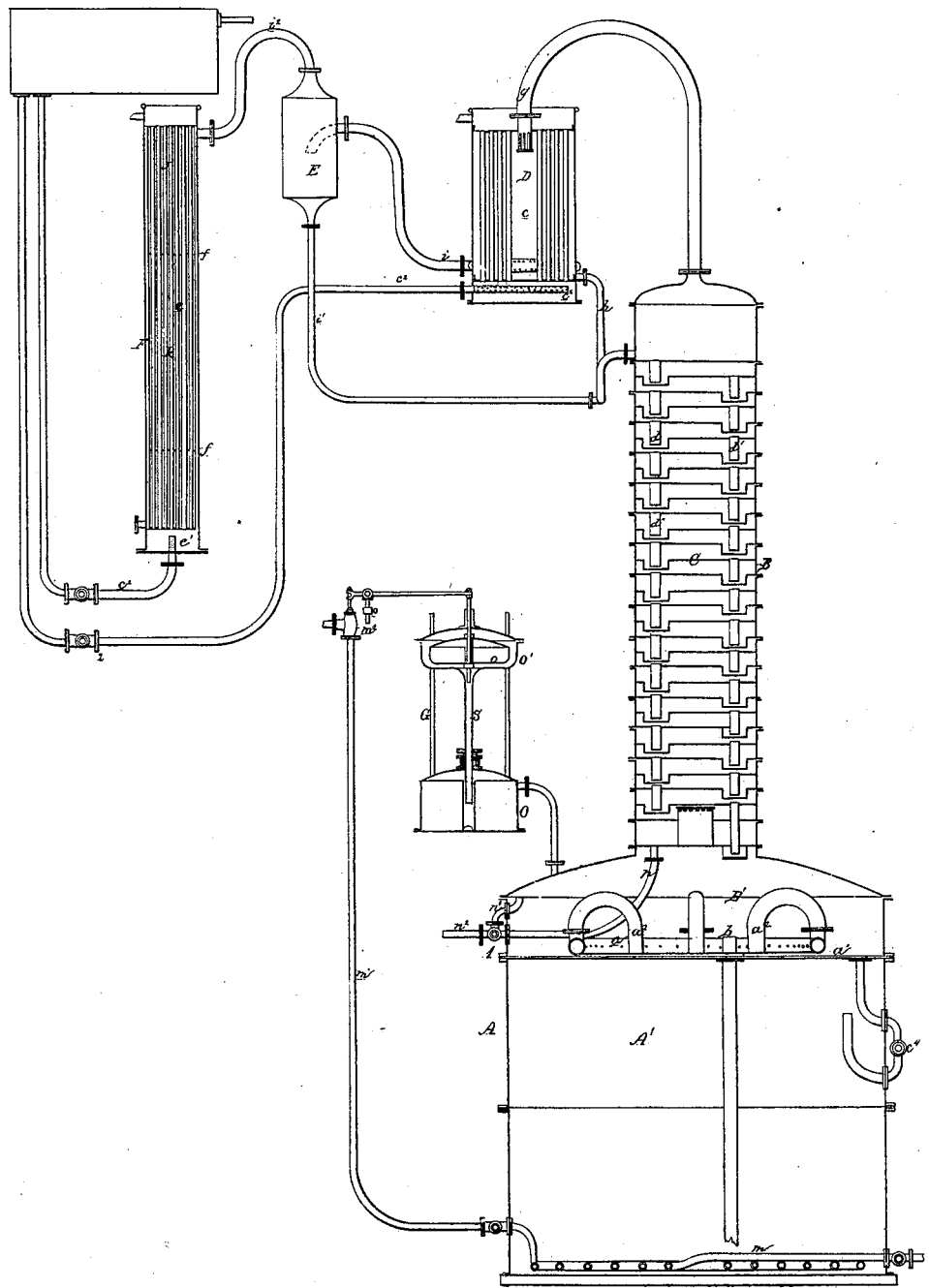

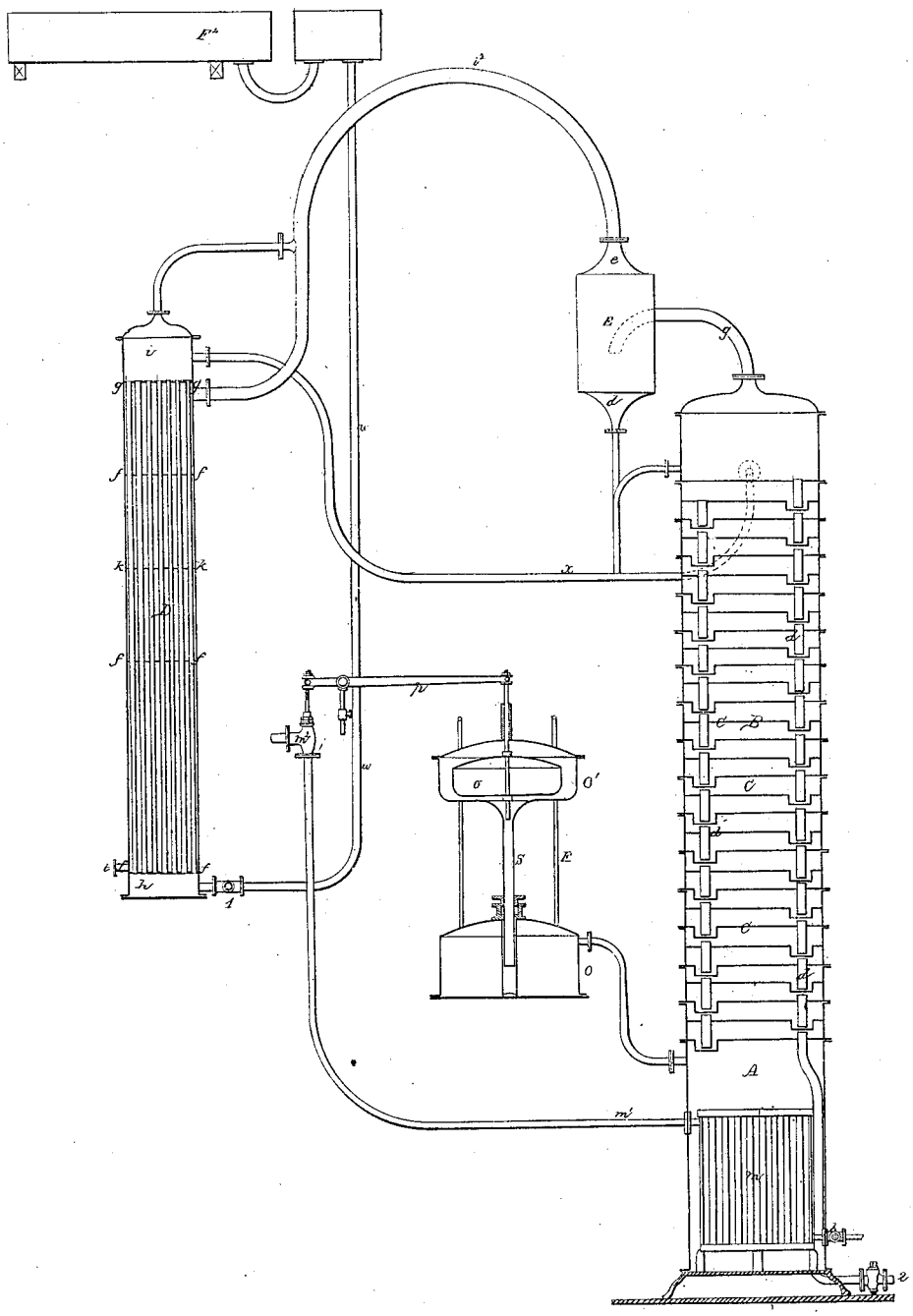

United States Patent Office.

D. SAVALLE, OF PARIS, FRANCE.

Letters Patent No. 79,260, dated June 23, 1868.

IMPROVED APPARATUS FOR DISTILLING.

*The Schedule referred to in these Letters Patent and making part of the same.*

TO ALL WHOM IT MAY CONCERN:

Be it known that I, D. SAVALLE, of Paris, France, have invented certain Improvements in Distilling-Apparatus; and I do hereby declare the following to be a full, clear, and exact description of the same.

My invention consists of a certain apparatus, constructed as fully described hereafter, whereby crude alcohols and other liquors may be quickly distilled and purified, with the use of but little if any water for condensing, and with a better result than with the ordinary apparatus; the apparatus being simple, inexpensive, not liable to get out of order, and requiring but little attention during its operation.

In order to enable others skilled in the art to make and use my invention, I will now proceed to describe its construction and operation, reference being had to the accompanying drawings, which form part of this specification, and in which—

The figure in Sheet No. 1 is a sectional elevation of my improved distilling-apparatus, and the figure in Sheet No. 2 is a sectional elevation of a modification.

In Sheet No. 1, A is a cylindrical vessel, having a dome-like top, and divided by a horizontal partition, $a^1$, into two compartments, A' and B'. In the compartment A' is a coil of steam-pipe, $m$, which communicates with a steam-generator through a pipe, $m^1$, and in the latter is a throttle-valve, $m^2$. In the compartment B is a perforated pipe, $a$, which communicates, through curved pipes $a^2$, with the compartment A', an overflow-pipe, $b$, projecting from twenty to thirty centimetres above the partition $a^1$.

To the top of the vessel A is connected an upright tube or column, B, containing a series of perforated plates or partitions, $c\ c$, arranged a short distance apart; the perforations being from eight to twelve per cent. of the surface of each plate; and through each plate extends a tube, $d$, which projects into a cup-like depression in the partition below it, as shown in the drawing. The upper tube extends about one centimetre above the surface of its plate, and the other tubes increase gradually in length, the lowest being about three centimetres above the surface of its plate.

Through the lowest plate passes a pipe, $n$, which extends through the side of the casing A to the casing of a three-way cock, 1, and with the latter communicate pipes $n^1\ n^2$; the pipe $n^1$ leading to a vessel, O, into which extends a tube, $s$, projecting from the bottom of a vessel, O', and in the latter is a float, $o$, which is connected by suitable devices to the throttle-valve $m^2$, so that when the float rises the throttle will close. The column B communicates, through a pipe, $g$, with a "condenser," D, consisting of a casing divided by two partitions, and a series of vertical pipes, into two chambers $e\ e'$, the former being the space between the partitions and round the pipes, and the latter the space below the lower partition and within the pipes.

The chamber $c$ communicates, through a pipe, $h$, with the upper part of the column B, and through a pipe, $i$, with what I term a "cleaner," E, which is a cylindrical casing, into which the end of the pipe $i$ projects. A pipe, $i^1$, leads from the lower end of the cleaner E to the pipe $h$, and a pipe, $i^2$, from the upper end of the casing to a "cooler," F.

The cooler F consists of a long casing or tube, closed at the lower end, and divided by two partitions, and vertical pipes $k$, with two compartments $e\ e^1$, the former being the space round the pipes and between the partitions, and the latter the space within the pipes and below the lower partition, and into the compartment $e^1$, and also into the compartment $c^1$ of the condenser, projects a water-pipe, $c^2$, having a "rose" at the inner end. Across the cooler extend one or more partitions $f$, in which are openings for the passage of the pipes $k$, the openings in the upper partition being three millimetres greater in diameter than the pipes, and those in the lower partition one millimetre greater.

The crude liquor is placed in the lower compartment A' of the casing or heater A, steam is admitted to the coil $m$ through the pipe $m^1$, and the vapor which rises from the heated material passes through the pipes $a\ a^2$ to the chamber B', the column C, and through the pipe $g$ to the condenser D. Water is now passed through the pipe $c^2$ to the condenser D, cooling the latter, so that the alcoholic vapors in the same are condensed, and flow through the tube $h$ back into the column, over the plates of which it passes successively until it falls into the compartments B', where it is brought into contact with the vapors from the lower compartment A', which are thus partially purified and condensed before entering the column.

When the column is charged with liquid, the passage of cold water to the condenser is so regulated, that not more than two-thirds of the vapors which pass into the condenser shall be condensed. The non-condensed vapors from the condenser pass to the separator E, and thence to the cooler F', where they are condensed by the water introduced through the pipe $c'$, and from the lower part of which the condensed liquor is drawn.

Should the pressure within the vessel A be too great, the steam passing through the pipe $n^1$ into the vessel $o$, will force a portion of the liquor in the latter into the vessel $o'$, the float $o$ will rise, and, through the medium of the devices connected to the throttle-valve $m^2$, will close or partially close the latter.

In like manner a decrease of pressure in the casing A will cause the float to descend and the throttle to be opened, a uniform steam-pressure and temperature being thus maintained in the apparatus.

The column of plates in this apparatus differs from those of the ordinary construction, inasmuch as the plates contain different quantities of liquor. In the old columns, the layer of liquor is of the same depth on each plate, and varies from five to eight centimetres in height, which gives these plates a capacity of from five to eight centimetres, cube, of liquid for a centimetre, square, of plate-surface. In the above-described column, the tubes $d$ are so arranged that the capacity of the plates varies from one to five centimetres, cube, of liquid to a centimetre, square, of plate-surface, the proportion of liquor increasing successively on each plate towards the lower end of the column.

By this arrangement a much more rapid passage of the liquor through the column is effected, the quality of the product is improved, and the operation is completed in less time.

In some columns it may be advantageous to diminish the extent of the perforations in the upper plates. As the openings in the plates C are from eight to twelve per cent. of the area of the plates, the vapor can pass upward more freely than in the ordinary columns where the openings do not exceed four per cent. of the area of the plates, the operation of the apparatus being thus greatly accelerated.

Owing to the construction of the condenser D, but a very small amount of water is required to effect a rapid condensation of the vapors, while the proportion of vapor condensed may be regulated at pleasure. If desired, the condenser may be arranged with its tubes in a horizontal position.

The cooler F is constructed in a manner very similar to the condenser, and with a like result, much less water being required than in coolers of the ordinary construction. Where a constant supply of water for the condenser or cooler is difficult to obtain, the modification illustrated in drawing No. 2 may be used.

In this apparatus there is but a single chamber below the column B, and the tube $g$ from the upper end of the latter passes directly into a "cleaner," E, which serves to receive foam and particles carried with it from the column, and prevents those sudden shocks which constantly derange ordinary apparatus; the vapor passing from the cleaner through a tube, $i^2$, to the upper end of the cooler F. This cooler is closed at the top, and communicates, through a pipe, with a reservoir containing the liquor to be distilled. This liquor passes into the lower part of the cooler, rises to the upper end through the tubes $k$, and passes through the pipe $x$ to the upper part of the column B, while the vapor passing from the cleaner E, enters the space in the cooler surrounding the tubes, and is cooled by imparting its heat to the cooler and to the liquor in the same; the liquor thus reaches the column in a heated state.

It will be seen that by this arrangement, the use of water for condensing and cooling the vapor is dispensed with. The above apparatus is superior to those of the ordinary form, inasmuch as it costs less to construct, works more rapidly, there is less loss of alcohol, and better product is obtained.

The crude alcohol may be purified by passing it through a mass of charcoal, and the alcohol may with advantage be conducted from the condenser through a mass of charcoal before passing it again into the column. The rectification by this means is distinguished from a rectification of crude alcohol, not purified, in that the product is finer in quality, greater in quantity, and of a better flavor.

I am aware that heating-chambers have been used in combination with columns containing perforated plates, through which extend short vertical tubes, and I am also aware that condensers and coolers have been used in connection with the said heaters and columns; I therefore lay no broad claim to an apparatus containing such parts, or to the parts separately; but

I claim as my invention, and desire to secure by Letters Patent—

1. The combination, with the column B, of a casing, A, divided int two compartments A' B', the lower containing a heating-pipe, $m$, and the upper a perforated pipe, $a$, or its equivalent, substantially as and for the purpose described.

2. Graduating the size of the openings in the perforated plates of the column, and the length of the tubes which extend above said plates, substantially as and for the purpose specified.

3. The casing O, communicating with the heater A, or with its column, in combination with the casing O', its tube $s$ and float $o$, connected to the throttle-valve $m^2$, the whole being arranged and operating substantially as and for the purpose described.

4. The arrangement, in respect to the heater A and column B, of a cooler, F, consisting of a casing divided by partitions and pipes into two compartments, one communicating with the column, and the other with the water-pipe $c^1$, as set forth.

In testimony whereof, I have signed my name to this specification in the presence of two subscribing witnesses.

D. SAVALLE.

Witnesses:
G. RICHARD,
JAMES HAND.